United States Patent [19]
Hashimoto et al.

[11] Patent Number: 5,860,331
[45] Date of Patent: Jan. 19, 1999

[54] TRANSMISSION GEAR

[75] Inventors: Akio Hashimoto; Hiroki Mori, both of Tsu, Japan

[73] Assignee: Teijin Seiki Co., Ltd., Osaka, Japan

[21] Appl. No.: 892,978

[22] Filed: Jul. 15, 1997

[30] Foreign Application Priority Data

| Jul. 31, 1996 | [JP] | Japan | 8-201696 |
| May 8, 1997 | [JP] | Japan | 9-117352 |

[51] Int. Cl.$^6$ ............................................. F16H 37/02
[52] U.S. Cl. ............................. 74/640; 901/21; 901/25
[58] Field of Search ........................ 74/640, 461, 665 L, 74/665 N; 901/21, 25

[56] References Cited

U.S. PATENT DOCUMENTS

| 3,128,641 | 4/1964 | Musser | 74/640 |
| 3,214,999 | 11/1965 | Lapp | 74/640 |
| 4,624,621 | 11/1986 | Murakami et al. | 74/640 |
| 5,222,409 | 6/1993 | Dalakian | 74/640 |

FOREIGN PATENT DOCUMENTS

| 214258 | 5/1968 | U.S.S.R. | 74/640 |
| 578515 | 10/1977 | U.S.S.R. | 74/640 |
| 1740826 | 6/1992 | U.S.S.R. | 74/640 |

*Primary Examiner*—Charles A. Marmor
*Assistant Examiner*—Sherry Lynn Estremsky
*Attorney, Agent, or Firm*—Lane, Aitken & McCann

[57] ABSTRACT

In a transmission gear for transmitting two rotary motions from a driving mechanism to a working mechanism, the transmission gear comprises a cylindrical support member, a flexible cylindrical member fixedly supported by the cylindrical support member, first and second input shaft members, and first and second output shaft members. The first and second input shaft members have non-circular peripheral portions, respectively. The first and second output shaft members have internal circular portions radially opposite to and spaced apart from the non-circular peripheral portions of the first and second input shaft members, respectively. The flexible cylindrical member interposes between the non-circular peripheral portions of the first and second input shaft members and the internal circular portions of the first and second output shaft members. The flexible cylindrical member further having a buffer portion between the first and second transformable intervening portions for allowing the first and second transformable intervening portions to transform independently of each other without interference, thereby transmitting the rotary motions from the first and second input shaft members to the first and second output shaft members, respectively, in independent relationship to each other.

19 Claims, 10 Drawing Sheets

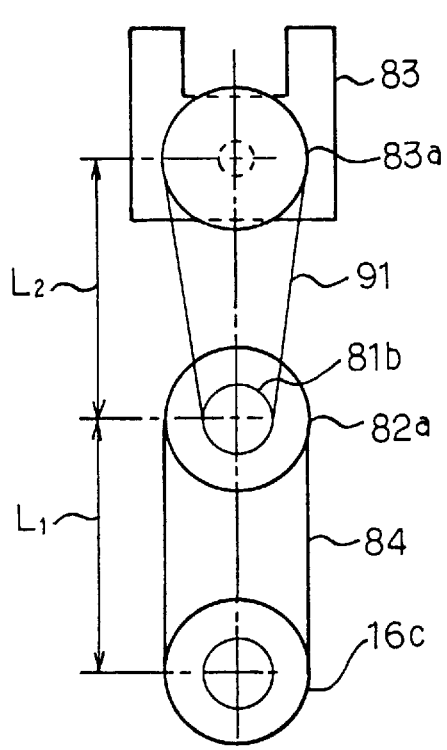
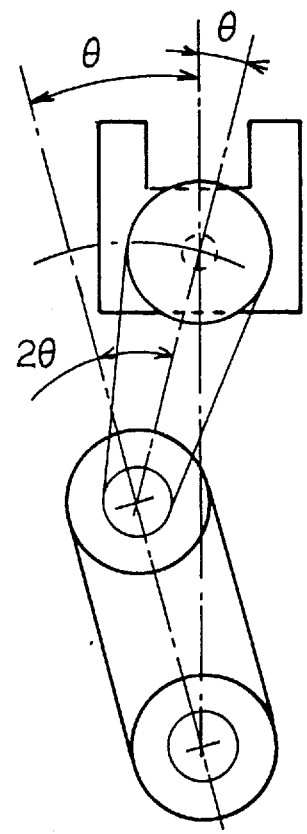
FIG. 5 (a)   FIG. 5 (b)

TRANSMISSION GEAR

BACKGROUND OF THE INVENTION

1. Field of the Invention

The present invention relates to a transmission gear, and more particularly to a transmission gear for transmitting two independent rotary motions from a driving mechanism to a working mechanism.

2. Description of the Related Art

There have so far been proposed a wide variety of transmission gears for transmitting a mechanical motion from certain devices to other devices. The transmission gears are generally utilized as change speed gears or speed reduction gears for converting a high speed rotary motion to a low speed rotary motion of large torque. The gears of these types include a so-called harmonic drive gear comprising input and output shaft members, and a flexible metal member intervening between the input and output shaft members. Such a gear mechanism is disclosed in, for example, Japanese Patent Laid-open Publication No. 1-216141 as comprising an input shaft member eccentrically formed with a cam portion and receiving the rotary motion from a power source such as an electric motor, and an output shaft member coaxially aligned with the input shaft member and connected to a working mechanism. The gear mechanism further comprises an externally toothed ring member rotatably supported by the cam portion of the input shaft member, an internally toothed ring member held at a standstill and in mesh with the externally toothed ring member, and a flexible member connected at one end thereof to the externally toothed ring member and at the other end thereof to the output shaft member. Since the internally toothed ring member is held at a standstill, the rotation of the cam portion of the input shaft member causes the externally toothed ring member to revolve slowly around the input shaft member in accordance with a difference in tooth number between the internally toothed ring member and the externally toothed ring member. The revolution of the externally toothed ring member is transmitted to the output shaft member through the flexible member. At this time, the flexible member functions as means for canceling the eccentric rotation between the externally toothed ring member and the output shaft member.

In the transmission gear thus constructed, if the driving mechanism side and the working mechanism side of the transmission gear are desired to be disconnected in spatial communication from each other, there is a necessity for the transmission gear to be equipped with spatial sealing means for disconnecting the driving mechanism side and the working mechanism side of the transmission gear from each other. The transmission gear is provided with the sealing means by adopting a magnetic fluid sealing system, a direct drive system, a magnetic coupling system or the like. If the transmission gear partially forms an apparatus for manufacturing a semiconductor devices, the working mechanism side of the transmission gear is frequently required to be pumped out to make a vacuum. At the same time, the working mechanism side of the transmission gear is required to be prevented from discharging gas for the purpose of obtaining a complete vacuum. For the this reason, the transmission gear is previously baked at high temperature so as to discharge the gas. The foregoing sealing means, however, cannot be baked at fully high temperature and, as a result, the complete vacuum cannot be obtained.

In order to eliminate the drawback, there has been proposed another transmission gear comprising a cup-shaped flexible member and disclosed in, for example, Japanese Patent Laid-open Publication No. 2-186151. The flexible member serves as both of the externally toothed ring member and the flexible member disclosed in the former Japanese Patent Laid-open Publication No. 1-216141. In the transmission gear disclosed in the latter Publication, the cup-shaped flexible member is fixedly supported by a support member held at a standstill, while the internally toothed gear is rotatable with respect to the support member and connected to the output shaft member.

If, however, a plurality of rotary motions are desired to be transmitted from the driving mechanism to the working mechanism, a drawback is encountered in prior-art transmission gears of the above described nature in that it is necessary for the transmission gear to include a plurality of flexible members respectively intervening between the input shaft members and the output shaft members and accordingly that the transmission gear increases in cost, complexity of construction and occupation space.

SUMMARY OF THE INVENTION

It is an object of the present invention to reduce the cost, the complexity of construction and the occupation space of the transmission gear having the ability to transmit a plurality of independent rotary motions from a driving mechanism to a working mechanism.

It is another object of the present invention to provide a transmission gear which is able to completely disconnect the driving mechanism side and the working mechanism side of the transmission gear in spatial communication and which can bear to be baked at high temperature.

In accordance with one aspect of the present invention, there is provided a transmission gear for transmitting two rotary motions from a driving mechanism to a working mechanism. The transmission gear comprises a first input shaft member to which one of the rotary motions is applied and a second input shaft member to which the other of the independent rotary motions is applied. The first input shaft member has a non-circular peripheral portion. The second input shaft member has a non-circular peripheral portion. The transmission gear further comprises a first output shaft member axially aligned with the first input shaft member, and a second output shaft member axially aligned with the second input shaft member. The first output shaft member has an internal circular portion radially opposite to and spaced apart from the non-circular peripheral portion of the first input shaft member. The second output shaft member has an internal circular portion radially opposite to and spaced apart from the non-circular peripheral portion of the second input shaft member. The transmission gear further comprises a flexible cylindrical member which radially surrounds both of the non-circular portions of the first and second input shaft members and which is radially encircled by both of the internal circular portions of the first and second output shaft members. The first and second input shaft members and the first and second output shaft members are rotatable about their own axes with respect to the flexible cylindrical member. The flexible cylindrical member has a first transformable intervening portion between the non-circular peripheral portion of the first input shaft member and the internal circular portion of the first output shaft member. The flexible cylindrical member further has a second transformable intervening portion between the non-circular peripheral portion of the second input shaft member and the internal circular portion of the second output shaft member. The non-circular peripheral portions of the first and second input shaft members are engaged with the internal circular portions of the first and second output shaft members through the first and second transformable intervening members, respectively. The first transformable intervening portion of the flexible cylindrical member is transformed in accordance with the one of the rotary motions of the non-circular peripheral portion of the first input shaft member to rotate the internal circular portion of the first output shaft member. The second transformable intervening portion of the flexible cylindrical member is transformed in accordance with the other of the rotary motions of the non-circular peripheral portion of the second input shaft member to rotate the internal circular portion of the second output shaft member. The flexible cylindrical member further has a buffer portion between the first and second transformable intervening portions for allowing the first and second transformable intervening portions to transform independently of each other without interference, thereby transmitting the rotary motions from the first and second input shaft members to the first and second output shaft members, respectively, in independent relationship to each other.

The buffer portion of the flexible cylindrical member may be rigid enough to sever a relation between the transformations of the first and second transformable intervening portions of the flexible cylindrical member. Alternatively, the buffer portion of the flexible cylindrical member may have a thickness which is large enough to sever a relation between the transformations of the first and second intervening potions of the flexible cylindrical member. Further alternatively, the buffer portion of the flexible cylindrical member may be long enough to sever a relation between the transformations of the first and second transformable intervening portions of the flexible cylindrical member.

In accordance with another aspect of the present invention, there is provided a transmission gear for transmitting two rotary motions from a driving mechanism to a working mechanism. The transmission gear comprises a partition member dividing a space in which the transmission gear exists, into two different spaces consisting of a first space in which the driving mechanism exists and a second space in which the working mechanism exists, and a first input shaft member to which one of the rotary motions is applied and which has a non-circular peripheral portion. The first input shaft member exists in the first space and is invariable in relative position and rotatable with respect to the partition member. The transmission gear further comprises a second input shaft member to which the other of the rotary motions is applied and which has a non-circular peripheral portion. The second input shaft member exists in the first space and is invariable in relative position and rotatable with respect to the partition member. The transmission gear further comprises a first output shaft member existing in the second space and axially aligned with the first input shaft member. The first output shaft member has an internal circular portion radially opposite to and spaced apart from the non-circular peripheral portion of the first input shaft member. The first output shaft member is invariable in relative position and rotatable with respect to the partition member. The transmission gear further comprises a second output shaft member existing in the second space and axially aligned with the second input shaft member. The second output shaft member has an internal circular portion radially opposite to and spaced apart from the non-circular peripheral portion of the second input shaft member. The second output shaft member is invariable in relative position and rotatable with respect to the partition member. The transmission gear further comprises a flexible cylindrical member which radially surrounds both of the non-circular portions of the first and second input shaft members and which is radially encircled by both of the internal circular portions of the first and second output shaft members. The first and second input shaft members and the first and second output shaft members are rotatable about their own axes with respect to the flexible cylindrical member. The flexible cylindrical member has a first transformable intervening portion between the non-circular peripheral portion of the first input shaft member and the internal circular portion of the first output shaft member. The flexible cylindrical member further has a second transformable intervening portion between the non-circular peripheral portion of the second input shaft member and the internal circular portion of the second output shaft member. The flexible cylindrical member is supported at one end thereof by partition member and closed at the other end thereof to form a cup-shaped configuration. The first and second spaces are disconnected in spatial communication from each other by both of the partition member and the flexible cylindrical member. The non-circular peripheral portions of the first and second input shaft members are engaged with the internal circular portions of the first and second output shaft members through the first and second transformable intervening members, respectively. The first transformable intervening portion of the flexible cylindrical member is transformed in accordance with the one of the rotary motions of the non-circular peripheral portion of the first input shaft member to rotate the internal circular portion of the first output shaft member. The second transformable intervening portion of the flexible cylindrical member is transformed in accordance with the other of the rotary motions of the non-circular peripheral portion of the second input shaft member to rotate the internal circular portion of the second output shaft member. The flexible cylindrical member further has a buffer portion between the first and second transformable intervening portions for allowing the first and second transformable intervening portions to transform independently of each other without interference, thereby transmitting the rotary motions from the first and second input shaft members to the first and second output shaft members, respectively, in independent relationship to each other.

The transmission gear may further comprise a cylindrical support member supported by the partition member. The cylindrical support member has at least an inside surface partially defining a second space. The flexible cylindrical member is received in the cylindrical support member. The second input shaft member has a tubelike configuration and has the first input shaft member threaded therethrough. The second output shaft member has a cylindrical configuration. The second output shaft member is received in and rotatably supported by the cylindrical fixed member. The first output shaft member is received in and rotatably supported by the second output shaft member.

The transmission gear may be constructed as described below. The driving mechanism consists of a first motor for rotating the first input shaft member and a second motor for rotating the second input shaft member. The second motor is supported by the cylindrical support member and having a through bore extending axially. The first motor is supported by the second motor. The first input shaft member goes through the through bore of the second motor and is operatively connected to the first motor. The second input shaft member is partially received in the through bore of the second motor and operatively connected to the second motor.

The transmission gear may further transmit a rectilinear motion from the driving mechanism to the working mechanism. The driving mechanism includes a rectilinear motion producing device for producing the rectilinear motion. The rectilinear motion is applied to the cylindrical support member. The transmission gear further comprises a cylindrical guide member fixedly supported by the partition member and having the cylindrical support member received therein. The flexible cylindrical member is fixedly connected to the cylindrical support member. The cylindrical support member is slidably moved with respect to the cylindrical guide member by the rectilinear motion. The rectilinear motion is transmitted from the drive mechanism to the working mechanism through the cylindrical support member and the first and second output shaft members. The transmission gear further comprises seal means for hermetically sealing a gap between the cylindrical guide member and the cylindrical support member.

The buffer portion of the flexible cylindrical member may be rigid enough to sever a relation between the transformations of the first and second transformable intervening portions of the flexible cylindrical member. Alternatively, the buffer portion of the flexible cylindrical member has a thickness which is large enough to sever a relation between the transformation of the first and second intervening potions of the flexible cylindrical member. Further alternatively, the buffer portion of the flexible cylindrical member is long enough to sever a relation between the transformations of the first and second transformable intervening portions of the flexible cylindrical member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5(a) and 5(b) are schematic views for explaining working mechanism of the robot arms shown in FIG. 4;

DESCRIPTION OF THE PREFERRED EMBODIMENTS

Figure 1:
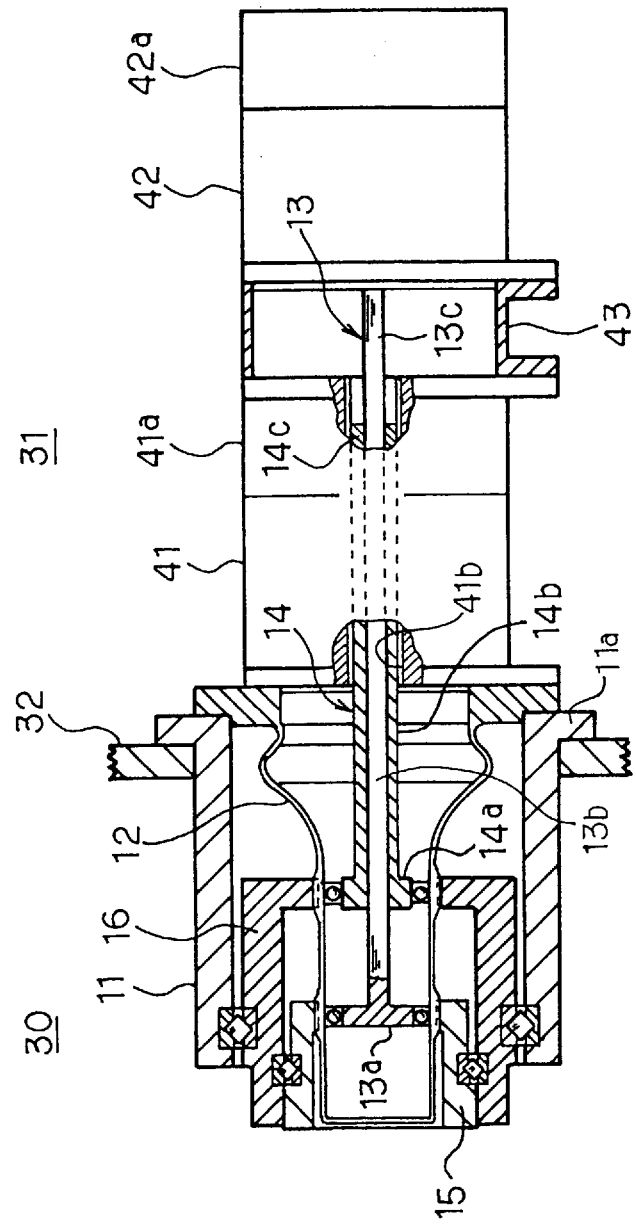
FIG. 1 is a cross sectional view showing a first preferred embodiment of the transmission gear according to the present invention.
Figure 2:
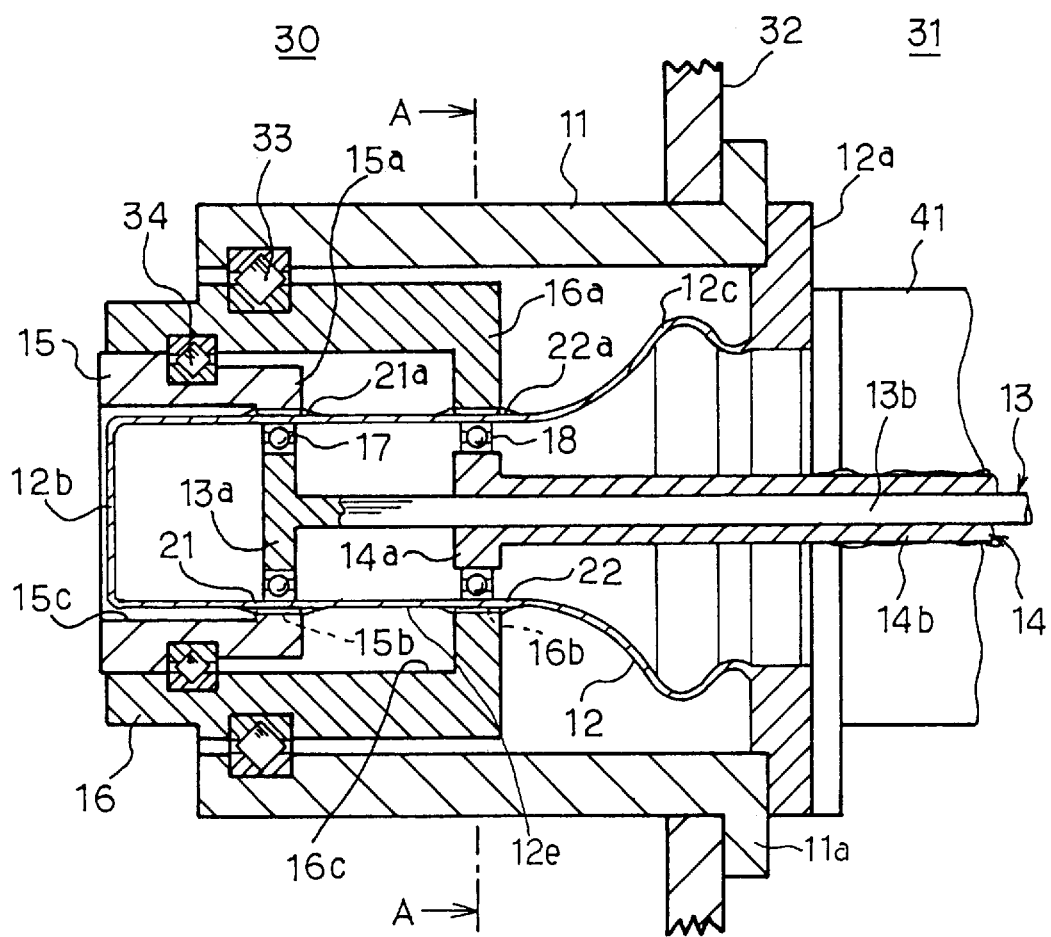
FIG. 2 is an enlarged cross sectional view showing part of the transmission gear shown in FIG. 1.
Figure 3:
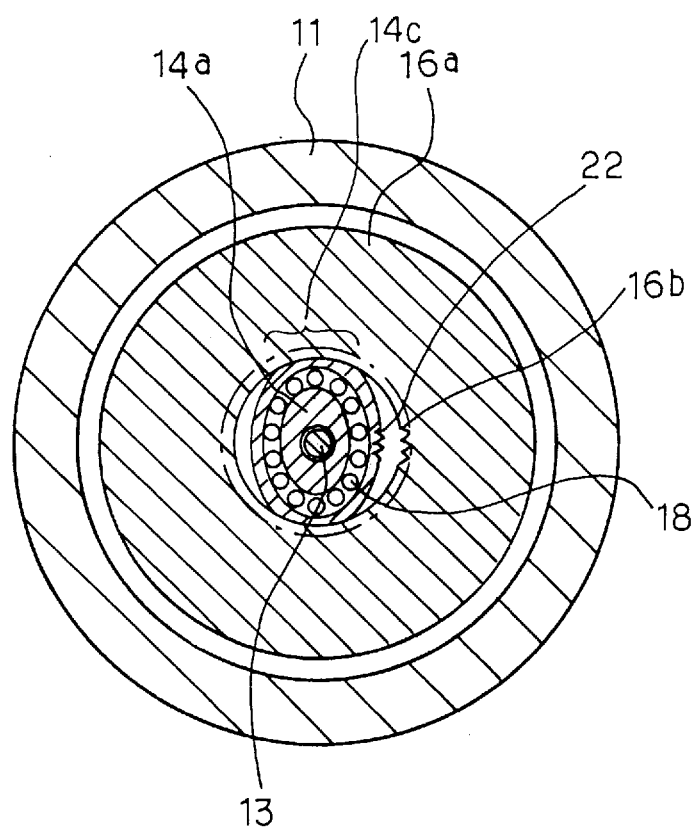
FIG. 3 is a cross sectional view taken on a plane indicated by line "A"—"A" of FIG. 2.

Referring to FIGS. 1 to 3 of the drawings, a first preferred embodiment of the transmission gear according to the present invention will be described hereinlater.

FIG. 1 is a cross sectional view of the transmission gear for transmitting first and second rotary motions from a driving mechanism to a working mechanism. The driving mechanism is constituted by first and second motors 42 and 41, while the working mechanism is not shown in FIGS. 1 to 3. The transmission gear comprises a first input shaft member 13 to which the first rotary motion is applied, and a second input shaft member 14 to which the second rotary motion is applied. The transmission gear further comprises a first output shaft member 15, a second output shaft member 16, a flexible cylindrical member 12 and a partition member 32. The first output shaft member 15 is axially aligned with the first input shaft member 13, while the second output shaft member 16 is axially aligned with the second input shaft member 14. The first and second input shaft members 13 and 14 and the first and second output shaft members 15 and 16 are rotatable about their own axes with respect to the flexible cylindrical member 12. The flexible cylindrical member 12 is made out of a metal such as a stainless steel and is fixedly supported by the following partition member 32.

FIG. 2 is an enlarged cross sectional view specifically showing part of the transmission gear shown in FIG. 1. As shown in FIG. 2, the first and second input shaft members 13 and 14 have non-circular peripheral portions 13a and 14a, respectively. As best shown in FIG. 3, the non-circular peripheral portion 14a of the second input shaft member 14 is formed into an ellipse configuration. Although not shown, the non-circular peripheral portion 13a of the first input shaft member 13 is similarly formed into an ellipse configuration. The non-circular peripheral portions 13a and 14a will be described below in detail. The first output shaft member 15 has an internal circular portion 15a radially opposite to and spaced apart from the non-circular peripheral portion 13a of the first input shaft member 13. The second output shaft member 16 has an internal circular portion 16a radially opposite to and spaced apart from the non-circular peripheral portion 14a of the second input shaft member 14. The flexible cylindrical member 12 is so arranged as to radially surround both of the non-circular peripheral portions 13a and 14a of the first and second input shaft members 13 and 14 and be radially encircled by both of the internal circular portions 15a and 16a of the first and second output shaft members 15 and 16.

The flexible cylindrical member 12 has a first transformable intervening portion 21 between the non-circular peripheral portion 13a of the first input shaft member 13 and the internal circular portion 15a of the first output shaft member 15. The flexible cylindrical member 12 further has a second transformable intervening portion 22 between the non-circular peripheral portion 14a of the second input shaft member 14 and the internal circular portion 16a of the second output shaft member 16. The non-circular peripheral portions 13a and 14a of the first and second input shaft members 13 and 14 are engaged with the internal circular portions 15a and 16a of the first and second output shaft members 15 and 16 through the first and second transformable intervening members 21 and 22, respectively. The first transformable intervening portion 21 of the flexible cylindrical member 12 is transformed in accordance with the first rotary motion of the non-circular peripheral portion 13a of the first input shaft member 13 to rotate the internal circular portion 15a of the first output shaft member 15. The second transformable intervening portion 22 of the flexible cylindrical member 12 is transformed in accordance with the second rotary motion of the non-circular peripheral portion 14a of the second input shaft member 14 to rotate the internal circular portion 16a of the second output shaft member 16.

The flexible cylindrical member 12 further has a buffer portion 12e between the first and second transformable intervening portions 21 and 22 for allowing the first and second transformable intervening portions 21 and 22 to transform independently of each other without interference. As a result, even if the first and second rotary motions are completely independent of each other, the transmission gear can transmit the first and second rotary motions from the first and second input shaft members 13 and 14 to the first and second output shaft members 15 and 16, respectively, in independent relationship to each other.

The first and second transformable intervening portions 21 and 22 of the flexible cylindrical member 12 are formed with first and second externally toothed gear portions 21a and 22a, respectively. The internal circular portions 15a and 16a of the first and second output shaft members 15 and 16 are formed with internally toothed gear portions 15b and 16b, respectively. The first externally toothed gear portion 21a of the flexible cylindrical member 12 is held in mesh with the internally toothed gear portion 15b of the first output shaft member 15. The internally toothed gear portion 15b of the first output shaft member 15 has tooth number larger than that of the first externally toothed gear portion 21a of the flexible cylindrical member 12. The second externally toothed gear portion 22a of the flexible cylindrical member 12 is held in mesh with the internally toothed gear portion 16b of the second output shaft member 16. The internally toothed gear portion 16b of the second output shaft member 16 has tooth number larger than that of the second externally toothed gear portion 22a of the flexible cylindrical member 12. This results in the fact that the transmission gear can transmit the first rotary motion from the first input shaft member 13 to the first output shaft member 15 to rotate the first output shaft member 15 at low speed in accordance with the difference in tooth number between the internally toothed gear portion 15b of the first output shaft member 15 and the first externally toothed gear portion 21a of the flexible cylindrical member 12. Likewise, the transmission gear can transmit the second rotary motion from the second input shaft member 14 to the second output shaft member 16 to rotate the second output shaft member 16 at low speed in accordance with the difference in tooth number between the internally toothed gear portion 16b of the second output shaft member 16 and the second externally toothed gear portion 22a of the flexible cylindrical member 12.

The transmission gear is shown in FIG. 2 as further comprising first and second inside bearing members 17 and 18. The first inside bearing member 17 intervenes between the non-circular peripheral portion 13a of the first input shaft member 13 and the flexible cylindrical member 12 for allowing the first input shaft member 13 to rotate smoothly with respect to the flexible cylindrical member 12. Similarly, the second inside bearing member 18 intervenes between the non-circular peripheral portion 14a of the second input shaft member 14 and the flexible cylindrical member 12 for allowing the second input shaft member 14 to rotate smoothly with respect to the flexible cylindrical member 12. The first and second inside bearing members 17 and 18 are flexible enough to transform in imitation of the flexible cylindrical member 12 at the time when the non-circular peripheral portions 13a and 14a of the first and second input shaft members 13 and 14 are rotated.

In FIG. 2, the partition member 32 of the transmission gear divides a space, in which the transmission gear exists, into two different spaces consisting of a first space 31 in which the driving mechanism exists and a second space 30 in which the working mechanism exists. Making the assumption that the second space 30 corresponds to outer space, the first space 31 is considered to be in a spaceship. Making the assumption that the second space 30 is in a closed vacuum chamber used for manufacturing semiconductor devices, the first space 31 is considered to be in air. The partition member 32 partially forms a wall of the closed vacuum chamber. The first input shaft member 13 exists in the first space 31 and is invariable in relative position and rotatable with respect to the partition member 32. The second input shaft member 14 exists in the first space 31 and is invariable in relative position and rotatable with respect to the partition member 32. The first output shaft member 15 exists in the second space 30 and is axially aligned with the first input shaft member 13. The second output shaft member 16 exists in the second space 30 and is axially aligned with the second input shaft member 14. The first output shaft member 15 is invariable in relative position and rotatable with respect to the partition member 32. The second output shaft member 16 is invariable in relative position and rotatable with respect to the partition member 32.

The transmission gear further comprises a cylindrical support member 11 supported by the partition member 32. The cylindrical support member 11 has at least an inside surface partially defining the second space 30. The flexible cylindrical member 12 is received in the cylindrical support member 11. The flexible cylindrical member 12 is supported at one end 12a thereof by both of the flexible cylindrical member 12 and the partition member 32 and closed at the other end 12b thereof to form a cup-shaped configuration. The first and second spaces 31 and 30 are disconnected in spatial communication from each other by both of the partition member 32 and the flexible cylindrical member 12. The flexible cylindrical member 12 further has a large diameter portion 12c formed on the side of the one end 12a for preventing the root of the flexible cylindrical member 12 from breaking.

As shown in FIG. 2, the second input shaft member 14 has a tubelike configuration 14b and has the first input shaft member 13 threaded therethrough. The second output shaft member 16 has a cylindrical configuration and has an internal space portion 16c. The second output shaft member 16 is received in and rotatably supported by the cylindrical support member 11 through a first bearing member 33. The first output shaft member 15 has an internal space portion 15c in which the flexible cylindrical member 12 is partially received on the side of the other end 12b. The first output shaft member 15 is received in the internal space portion 16c of the second output shaft member 16 and rotatably supported by the second output shaft member 16 through a second bearing member 34. The first and second bearing members 33 and 34 are shown in FIG. 2 by way of example as cross roller bearings.

Returning back to FIG. 1, the second motor 41 is fixedly supported by the cylindrical support member 11 and has a through bore 41b extending axially. The first motor 42 is fixedly supported by the second motor 41. The first input shaft member 13 goes through the through bore 41b of the second motor 41 and is operatively connected to the first motor 42 at a basal portion 13c of the first input shaft member 13. The second input shaft member 14 is partially received in the through bore 41b of the second motor 41 and operatively connected to the second motor 41. Although the first motor 42 is indirectly supported by the cylindrical support member 11 through the second motor 41 and a bracket 43 which is mounted on the second motor 41 in this embodiment, the first motor 42 may be directly supported by the cylindrical support member 11.

The first and second motors 42 and 41 include detectors 42a and 41a equipped with encoders for detecting information on the first and second rotary motions of the first and second motors 42 and 41, respectively. The information on the first and second rotary motions are transmitted to a controller (not shown). The first and second motors 42 and 41 are controlled in rotation angle and rotation velocity by the controller on the basis of the information on the first and second rotary motions, respectively. The first and second motors 42 and 41 can be independently operated and, therefore, the first and second rotary motions are independent of each other.

The buffer portion 12e of the flexible cylindrical member 12 is rigid enough to sever a relation between the transformations of the first and second transformable intervening portions 21 and 22 of the flexible cylindrical member 12. Alternatively, the buffer portion 12e of the flexible cylindrical member 12 may have a thickness which is large enough to sever a relation between the transformation of the first and second intervening potions 21 and 22 of the flexible cylindrical member 12. In case the buffer portion 12e of the flexible cylindrical member 12 is not rigid nor thick, the buffer portion 12e may be long enough to sever a relation between the transformations of the first and second transformable intervening portions 21 and 22 of the flexible cylindrical member 12. Since the flexible cylindrical member 12 is thus formed, it is possible to transmit the first and second rotary motions from the first and second input shaft members 13 and 14 to the first and second output shaft members 15 and 16, respectively, in independent relationship to each other.

As shown in FIG. 3, the non-circular peripheral portion 14a has an ellipse configuration and accordingly has two symmetrical outermost portions, one of which is designated by "14c". Likewise, the non-circular peripheral portion 13a has an ellipse configuration and accordingly has two outermost portions (not shown). The outermost portions of the non-circular peripheral portions 13a and 14a of the first and second input shaft members 13 and 14 respectively force the first and second intervening portions 21 and 22 of the flexible cylindrical member 12 to transform outward radially, thereby bringing the first and second externally toothed gear portions 21a and 22 of the first and second transformable intervening portions 21 and 22 into mesh with the internally toothed gear portions 15b and 16b of the first and second output shaft members 15 and 16, respectively.

When the first input shaft member 13 is rotated by the first motor 42, the outermost portions of the first input shaft member 13 are revolved around the axis of the first input shaft member 13 along the internal circular portion 15a of the first output shaft member 15. The revolution of the outermost portions of the first input shaft member 13 results in the fact that the first externally toothed gear portion 21a of the flexible cylindrical member 12 being relatively rotated with respect to the internally toothed gear portion 15b of the first output shaft member 15 in accordance with a difference in tooth number between the first externally toothed gear portion 21a and the internally toothed gear portion 15a of the first output shaft member 15. More specifically, in case that the first input shaft member 13 is rotated by an angle of 360°, the first externally toothed gear portion 21a of the flexible cylindrical member 12 is relatively rotated with respect to the first input shaft member 15 by an angle corresponding to the difference in tooth number between the first externally toothed gear portion 21a and the internally toothed gear portion 15a. In fact, the flexible cylindrical member 12 is fixed to the partition member 32, so that the first output shaft member 15 is rotated with respect to the flexible cylindrical member 12, i.e. the partition member 32.

Similarly, when the second input shaft member 14 is rotated by the second motor 41, the outermost portions of the second input shaft member 14 are revolved around the axis of the second input shaft member 14 along the internal circular portion 16a of the second output shaft member 16. The revolution of the outermost portions of the second input shaft member 14 results in the fact that the second externally toothed gear portion 22a of the flexible cylindrical member 12 being relatively rotated with respect to the internally toothed gear portion 16b of the second output shaft member 16 in accordance with a difference in tooth number between the second externally toothed gear portion 22a and the internally toothed gear portion 16a of the second output shaft member 16. More specifically, in case that the second input shaft member 14 is rotated by an angle of 360°, the second externally toothed gear portion 22a of the flexible cylindrical member 12 is relatively rotated with respect to the second input shaft member 16 by an angle corresponding to the difference in tooth number between the second externally toothed gear portion 22a and the internally toothed gear portion 16a. In fact, flexible cylindrical member 12 is fixed to the partition member 32, so that the second output shaft member 16 is rotated with respect to the flexible cylindrical member 12, i.e. the partition member 32.

As will be appreciated from the foregoing description representing the first embodiment, the transmission gear can transmit the first and second rotary motions from the first and second input shaft members 13 and 14 to the first and second output shaft members 15 and 16, respectively, in independent relationship to each other because of the fact that the first and second transformable intervening portions 21 and 22 of the flexible cylindrical member 12 are transformed independently of each other without interference. Furthermore, the first rotary motion is transmitted from the first input shaft member 13 to the first output shaft member 15 to rotate the first output shaft member 15 at low speed in accordance with the difference in tooth number between the internally toothed gear portion 15b of the first output shaft member 15 and the first externally toothed gear portion 21a of the flexible cylindrical member 12, while the second rotary motion is transmitted from the second input shaft member 14 to the second output shaft member 16 to rotate the second output shaft member 16 at low speed in accordance with the difference in tooth number between the internally toothed gear portion 16a of the second output shaft member 16 and the second externally toothed gear portion 22a of the flexible cylindrical member 12. This results in the fact that the first and second output shaft members 15 and 16 can be rotated slowly in comparison to the first and second input shaft members 13 and 14, respectively. In addition, since two transmission systems respectively transmitting different rotary motions hold one flexible cylindrical member in common, the transmission gear is advantageous over prior-art gears in reducing cost, complexity of construction and occupation space thereof. The input shaft members 13 and 14 are arranged in coaxial relationship to each other. Likewise, the output shaft members 15 and 16 are arranged in coaxial relationship to each other. The arrangement of the shaft members causes the transmission gear to be more compact. Furthermore, the transmission gear can output rotary motions each having a large torque and a low speed in comparison with the rotary motions inputted therein. Since the first and second motors 42 and 41 are axially aligned in close relationship to each other, the driving mechanism can be small-sized. The flexible cylindrical member 12 corresponds to sealing means for disconnecting the working mechanism side of the transmission gear from the driving mechanism side of the transmission gear in spatial communication. This means that the sealing means can be embodied in simple construction. Furthermore, the flexible cylindrical member 12 allows the first and second input shaft members 13 and 14 to be inserted from one side of the flexible cylindrical member 12 and is inserted into the first and second output shaft members 15 and 16 from the other side of the flexible cylindrical member 12. Therefore, not only is embodied the sealing means, the first and second input shaft members 13 and 14 and the first and second output shaft members 15 and 16 also can be coupled and uncoupled with ease. If there is no need to disconnect the driving mechanism side and the working mechanism side of the transmission gear, she other end 12b of the flexible cylindrical member 12 may have an open end.

Figure 4:
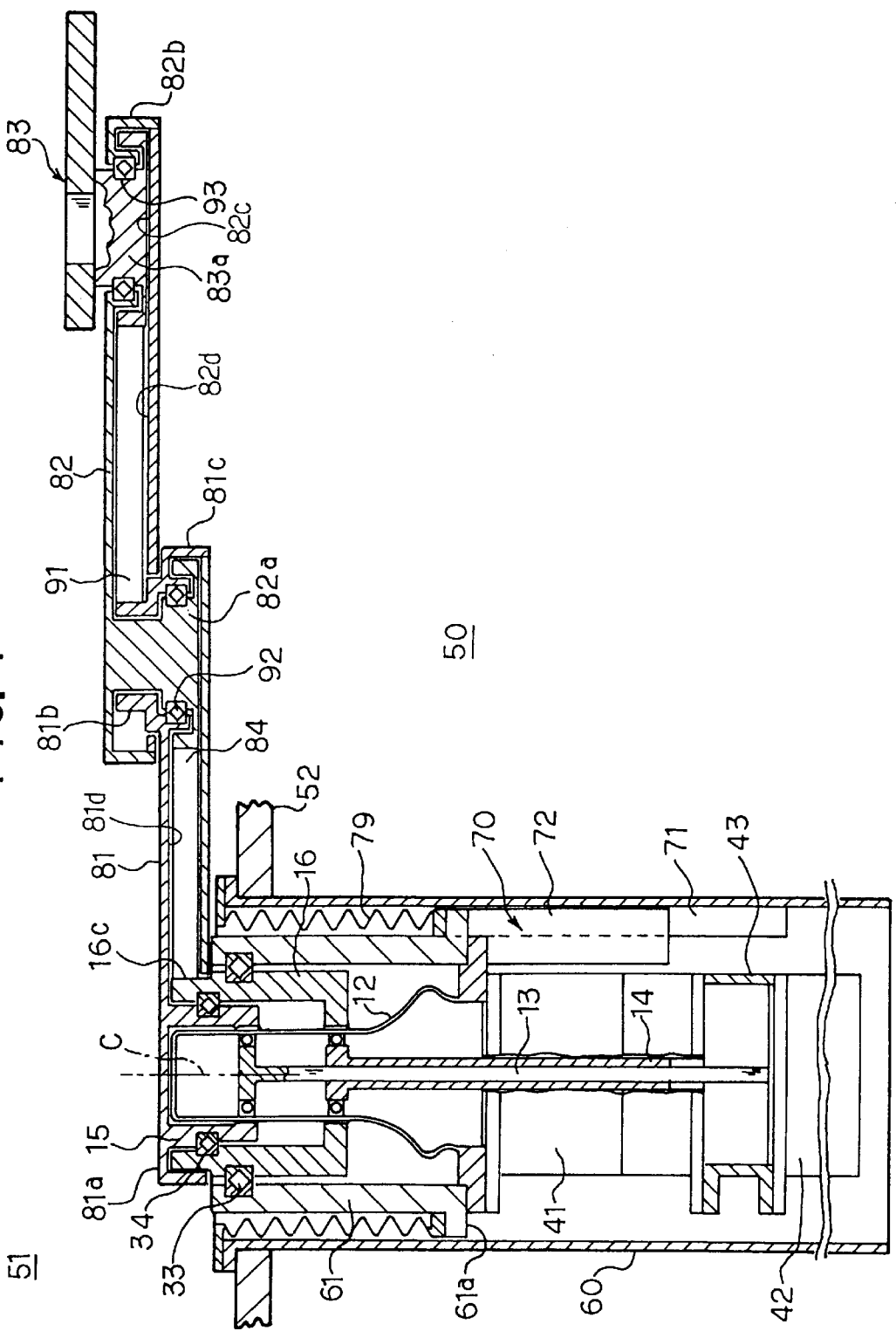
FIG. 4 is a cross sectional view showing a second preferred embodiment of the transmission gear according to the present invention.

Referring to FIGS. 4 and 5 of the drawings, a second embodiment of the transmission gear according to the present invention will be described hereinlater. The second embodiment of the transmission gear shown in FIG. 2 is adapted to a scalar type of robot used for the manufacturing semiconductor device. The second embodiment of the transmission gear has same constitutional elements as those of the first embodiment of the transmission gear. The same constitutional elements of the second embodiment are designated by the same reference numerals and symbols as those of the first embodiment, respectively, with the intention of omitting repeated description thereof.

As shown in FIG. 4, the transmission gear comprises a partition member 52 divides a space, in which the transmission gear exists, into two different spaces consisting of a first space 50 in which the first and second input shaft members 13 and 14 exist and a second space 51 in which the first and second output shaft members 15 and 16 exist. The first space 50 is in air, while the second space 51 is in the closed vacuum chamber used for the manufacturing semiconductor device. The transmission gear further comprises a cylindrical guide member 60 fixedly supported by the partition member 52, and a cylindrical support member 61 received in the cylindrical guide member 60. The cylindrical support member 61 has at least an inside surface which partially defines the second space 51. In this embodiment, the second motor 41 is supported by the cylindrical support member 61, while the first motor 42 is supported by the second motor 41 though the bracket 43. The driving mechanism of the transmission gear includes a rectilinear motion producing device 70 for producing a rectilinear motion. The rectilinear motion producing device 70 includes a rack member 71 and a rectilinear motion generator 72. The rack member 71 has one end portion mounted on the cylindrical member 60. The rectilinear motion generator 72 is held in mesh with the rack member 71 and supported by the cylindrical member 60. The rectilinear motion is applied to the cylindrical support member 61 by the rectilinear motion generator 72. The cylindrical support member 61 and the rack member 71 are axially movable with respect to the cylindrical support member 61. The cylindrical support member 61 is slidably moved with respect to the cylindrical guide member 60 in accordance with the applied rectilinear motion. The rectilinear motion is transmitted from the driving mechanism to the working mechanism through the cylindrical support member 61 and the first and second output shaft members 15 and 16. The transmission gear, therefore, can also transmit the rectilinear motion from the driving mechanism to the working mechanism in addition to the rotary motions. The transmission gear further comprises seal means 79 for hermetically sealing a gap between the cylindrical guide member 60 and the cylindrical support member 61. The seal means 79 is constituted by a bellows which is flexibly transformable in accordance with the rectilinear motion. Similarly to the first embodiment, the flexible cylindrical member 12 is received in the cylindrical support member 61 and fixedly supported by the cylindrical support member 61.

The transmission gear further comprises first and second arms 81 and 82 rotatable about the common center axis C of the first and second input shaft members 13 and 14. The first arm 81 has a basal end portion 81a integrally formed with one end portion of the output shaft member 15, a top end portion 81c formed with a boss portion 81b and a hollow portion 81d between the basal end portion 81a and the top end portion 81c. The second arm 82 has at one end thereof a basal pulley portion 82a rotatably received in the boss portion 81b of the first arm 81 through a bearing 92, at the other end thereof a recess portion 82c. The second arm 82 further has a hollow portion 82d between the basal pulley portion 82a and the recess portion 82c. The second output shaft member 16 has a pulley portion 16c formed at its end. The second arm 82 is pivotally connected to the second output shaft member 16 though an endless belt 84. The endless belt 84 is received in the hollow portion 81d of the first arm 81 and is passed between the basal pulley portion 82a of the second arm 82 and the pulley portion 16c of the second output shaft member 16. Therefore, the second arm 82 can rotate about the axis C. The transmission gear further comprises a hand 83 used for predetermined workings and rotatably supported by the second arm 82 though a bearing 93. The hand 83 has a pulley portion 83a received in the recess portion 82c of the second arm 82. The hand 83 is pivotally connected to the first arm 81 through an endless belt 91. The endless belt 91 is received in the hollow portion 82d of the second arm 82 and is passed between the pulley portion 83a of the hand 83 and the boss portion 81b of the first arm 81. Therefore, the hand 83 can also rotate about the axis C.

More specifically, in this embodiment shown in FIG. 5, the ratio of the diameter of the pulley portion 16c of the second output shaft member 16 to that of the basal pulley portion 82a of the second arm 82 is 1 to 1. Furthermore, the ratio of the diameter or the tooth number of the boss portion 81b of the first arm 81 to that of the pulley portion 83a of the hand 83 is 1 to 2. In this case, the ratio of the distance L1 between the center point of the pulley portion 16c of the second output shaft member 16 and that of the basal pulley portion 82a of the second arm 82 to the distance L2 between the center point of the basal pulley portion 82a of the second arm 82 and that of the pulley portion 83a of the hand 83 is 1 to 1. When at least one of the first and second output shaft members 15 and 16 is rotated about the axis C, the second arm 82 rotates about the center axis of the boss portion 81b of the first arm 81, or revolves around the axis of the cylindrical support member 61 together with the first arm 81. When the second arm 82 rotates about the center axis of the boss portion 81b of the first arm 81, the hand 83 makes the rectilinear motion in accordance with the ratio of the diameter or the tooth number of the boss portion 81b of the first arm 81 and that of the pulley portion 83a of the hand 83 and keeps its own head on a line as shown in FIGS. 5(a) and 5(b).

Similarly to the first embodiment, when the first and second input shaft members 13 and 14 are rotated, the outermost portions of the non-circular peripheral portions 13a and 14a of the first and second input shaft members 13 and 14 force the first and second intervening portions 21 and 22 of the flexible cylindrical member 12 to transform outward radially, thereby bringing the first and second externally toothed gear portions 21a and 22 of the first and second transformable intervening portions 21 and 22 into mesh with the internally toothed gear portions 15b and 16b of the first and second output shaft members 15 and 16, respectively. Therefore, when at least one of the first and second input shaft members 13 and 14 is rotated, the first or second output shaft member 15 or 16 each corresponding to the rotated input shaft member is rotated in accordance with the transformations of the first intervening potion 21 or the second intervening potion 22 of the flexible cylindrical member 12. If the first and second output shaft members 15 and 16 are rotated in different directions or if one of the first and second output shaft members 15 and 16 is rotated, one of the first and second output shaft members 15 and 16 is relatively rotated with respect to the other of the first and second output shaft members 15 and 16. As a result, the first arm 81 is rotated about the axis C in accordance with the rotary motions of the first output shaft member 15, while the second arm 82 is revolved around the axis C and rotated about the center axis of the boss portion 81b of the first arm 81.

If desire, the rectilinear motion may be applied to the cylindrical support member 61 by the rectilinear motion producing device 70. In this case, the flexible cylindrical member 12 and the first and second motors 42 and 41 are axially moved with respect to the partition member 52. The hand 83 can perform predetermined operations such as loading and unloading operations for the manufacturing semiconductor device which is placed in the second space 51 corresponding to the vacuum chamber.

The rectilinear motion producing device 70 generally has rectilinear slider portions producing large heat energy. In the present embodiment, the manufacturing semiconductor device has no need of another rectilinear motion producing device in the second space 51 because of the fact that the hand 83 can be operated by the rectilinear motion producing device 70 which exists in the first space 50. This means that the transmission gear can prevent the second space 51 from rising in temperature.

In general, the manufacturing apparatus for semiconductor device is continuously operated for long time in the vacuum chamber, so that the vacuum chamber is liable to be soiled with thin film materials. For this reason, it is necessary to regularly open, clean up and maintain the vacuum chamber. When opened, the vacuum chamber is filled with air. At this time, the water vapor is absorbed by the inner wall of the partition member 52. If the air is pumped out again from the vacuum chamber to form a vacuum without specific processes after the cleaning and maintenance of the vacuum chamber, the second space 51 cannot have a high degree of vacuum because of the fact that the molecules of the water vapor on the inner wall of the partition member 52 are in equilibrium with those of the gas in the vacuum chamber. In order to eliminate the drawback, the process of baking is generally performed to eliminate the molecules of the water vapor and the gas from the vacuum chamber before the process of creating a vacuum in the vacuum chamber. In the present embodiment, the baking process is perfectly performed. The reason is that the flexible cylindrical member 12 serving as seal means is made of a metal such as a stainless steel and as a consequence the baking process can be performed at high temperature, for instance, beyond 200° C., or preferably 400° C.

Several experiments are carried out in order to prove that the flexible cylindrical member in the present embodiment is superior to other seal systems. The results of the several experiments are shown in a table made as follows:

| Seal System Type: | Flexible Cylindrical Member According to the Present Invention | Magnetic Coupling System | Direct Drive System | Magnetic Fluid Seal System |
| --- | --- | --- | --- | --- |
| Baking Temperature: Characteristics for Determination of Baking Temperature: | 400° C. Annealing Temperature of Stainless Steel | 150–200° C. Curie Point | 150–200° C. Curie Point or Heat Resistant of Insulating Member | Impossible to Heat Evaporative Component Contained in Magnetic Fluid |
| Capability in Transmitting Motion: | ○ | x | Δ | ⊚ |
| Timelag for Stopping: | 1 min. | 5 min. | 0.1 min. | 0 |
| Out of Harmony: | Not Occurred | Occurred | Occurred | Not Occurred |

⊚: Excellent
○: High
Δ: Border-line case
x: Poor

As will be appreciated from the results of the experiments, the tolerable temperature of the flexible cylindrical member is extremely higher than other seal systems. In addition, the flexible cylindrical member is recognized to be superior in total quality to other seal systems.

Figure 6:
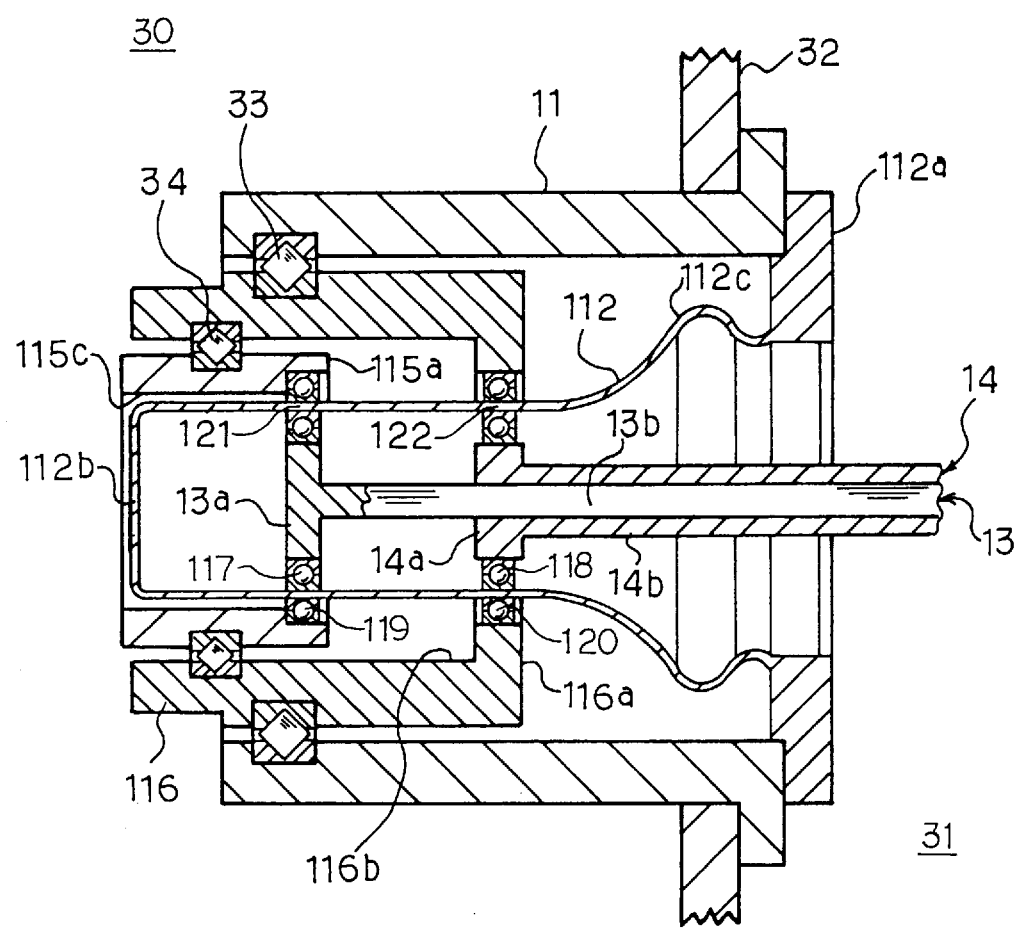
FIG. 6 is a cross sectional view showing a third preferred embodiment of the transmission gear according to the present invention.

Referring to FIG. 6 of the drawings, a third embodiment of the transmission gear according to the present invention will be described hereinlater.

The present embodiment of the transmission gear comprises the same constitutional elements as those of the first embodiment of the transmission gear except a flexible cylindrical member 112 substituted for the flexible cylindrical member 12 of the first embodiment, and first and second output shaft members 115 and 116 substituted for the first and second output shaft members 15 and 16 of the first embodiment, respectively. The same constitutional elements are designated by the same reference numerals and symbols as those of the first embodiment, respectively, with the intention of omitting repeated description thereof As shown in FIG. 6, the first and second output shaft members 115 and 116 have internal circular portions 115a and 116a opposite to and spaced apart from the non-circular peripheral portions 13a and 14a of the first and second input shaft members 13 and 14, respectively. The first and second output shaft members 115 and 116 are invariable in relative position and rotatable with respect to the partition member 32, respectively. The flexible cylindrical member 112 radially surrounds both of the non-circular portions 13a and 14a of the first and second input shaft members 13 and 14 and is radially encircled by both of the internal circular portions 115a and 116a of the first and second output shaft members 115 and 116. The first and second input shaft members 13 and 14 and the first and second output shaft members 115 and 116 are rotatable about their own axes with respect to the flexible cylindrical member 112. The flexible cylindrical member 112 has a first transformable intervening portion 121 between the non-circular peripheral portion 13a of the first input shaft member 13 and the internal circular portion 115a of the first output shaft member 115. The flexible cylindrical member 112 further has a second transformable intervening portion 122 between the non-circular peripheral portion 14a of the second input shaft member 14 and the internal circular portion 116a of the second output shaft member 116. The flexible cylindrical member 112 is supported at one end 112a thereof by both of the cylindrical support member 11 and the partition member 32 and closed at the other end 112b thereof to form a cup-shaped configuration. Therefore, the first and second spaces 31 and 30 are disconnected in spatial communication from each other by both of the partition member 32 and the flexible cylindrical member 112.

The first transformable intervening portion 121 of the flexible cylindrical member 112 is transformed in accordance with the first rotary motion of the non-circular peripheral portion 13a of the first input shaft member 13 to rotate the internal circular portion 115a of the first output shaft member 115. Similarly, the second transformable intervening portion 122 of the flexible cylindrical member 112 is transformed in accordance with the second rotary motion of the non-circular peripheral portion 14a of the second input shaft member 14 to rotate the internal circular portion 116a of the second output shaft member 116. The flexible cylindrical member 112 further has a buffer portion between the first and second transformable intervening portions 121 and 122 for allowing the first and second transformable intervening portions 121 and 122 to transform independently of each other without interference, thereby transmitting the first and second rotary motions from the first and second input shaft members 13 and 14 to the first and second output shaft members 115 and 116, respectively, in independent relationship to each other.

The transmission gear further comprises a first inside bearing member 117 intervening between the non-circular peripheral portion 13a of the first input shaft member 13 and the flexible cylindrical member 112, and a second inside bearing member 118 intervening between the non-circular peripheral portion 14a of the second input shaft member 14 and the flexible cylindrical member 112. The first and second inside bearing members 117 and 118 allow the first and second input shaft members 13 and 14, respectively, to rotate smoothly with respect to the flexible cylindrical member 112. The transmission gear further comprises a first outside bearing member 119 intervening between the flexible cylindrical member 112 and the internal circular portion 115a of the first output shaft member 115, and a second outside bearing member 120 intervening between the flexible cylindrical member 112 and the internal circular portion 116a of the second output shaft member 116. The first and second outside bearing members 119 and 120 allow the first and second output shaft members 115 and 116, respectively, to rotate smoothly with respect to the flexible cylindrical member 112. If, however, desired, the first and second inside bearing members 117 and 118 may include rollers for preventing the transmission gear from increasing the temperature due to the friction between the flexible cylindrical member 112 and the non-circular portions 13a and 14a of the first and second input shaft members 13 and 14. Likewise, if desired, the first and second outside bearing members 119 and 120 may include rollers for preventing the transmission gear from increasing the temperature due to the friction between the flexible cylindrical member 112 and the internal circular portions 115a and 116a of the first and second output shaft members 115 and 116.

In this embodiment, the flexible cylindrical member 112 has no toothed gear portion formed thereon. Thus, the present embodiment of the transmission gear can output same rotary motions as the first and second rotary motions transmitted from the first and second input shaft members 13 and 14 to the first and second output shaft members 115 and 116, respectively. Furthermore, the flexible cylindrical member 112 is made out of a metal. This results in the fact that the flexible cylindrical member 112 can be heated at high temperature. Therefore, the process of baking the flexible cylindrical member 112 can be performed at high temperature, thereby causing the gas to be eliminated from the second space 30 and forming a perfect vacuum in the second space 30. This means that the flexible cylindrical member 112 can serve as excellent partitioning means for disconnecting the first and second spaces 31 and 30 in spatial communication from each other.

Figure 7:
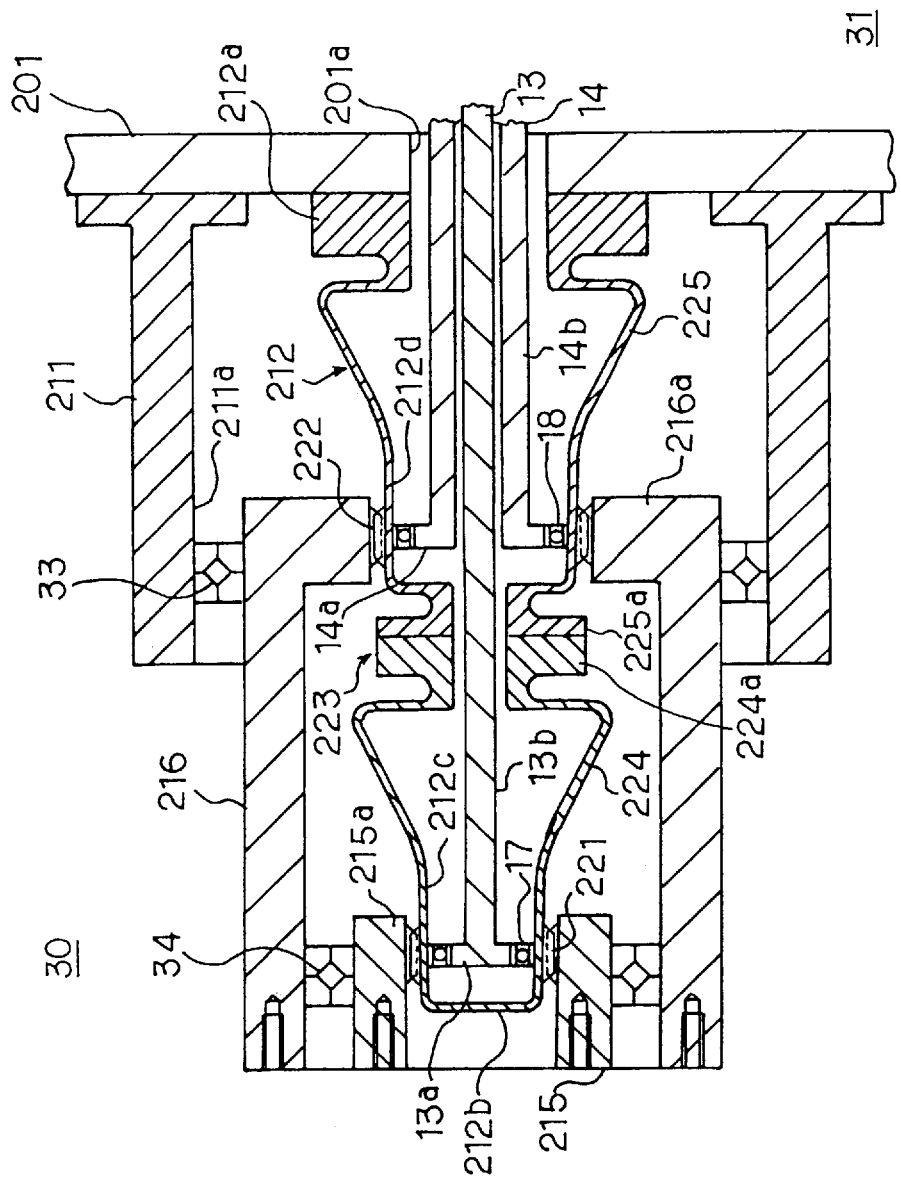
FIG. 7 is a cross sectional view showing a fourth preferred embodiment of the transmission gear according to the present invention.

Referring to FIG. 7 of the drawings, a fourth embodiment of the transmission gear according to the present invention will be described hereinlater.

As shown in FIG. 7, the present embodiment of the transmission gear comprises the same constitutional elements as those of the first embodiment of the transmission gear shown in FIGS. 1 to 3 except a partition member 201 substituted for the partition member 32 of the first embodiment, a cylindrical support member 211 substituted for the cylindrical support member 11 of the first embodiment, first and second output shaft members 215 and 216 substituted for the first and second output shaft members 15 and 16 of the first embodiment, a flexible cylindrical member 212 substituted for the flexible cylindrical member 12 of the first embodiment. The same constitutional elements are designated by the same reference numerals and symbols as those of the first embodiment, respectively, with the intention of omitting repeated description thereof.

The partition member 201 extends in a vertical direction and divides a space in which the transmission gear exists, into two different spaces consisting of the first space 31 in which the driving mechanism exists and the second space 30 in which the working mechanism exists. The cylindrical support member 211 is supported by the partition member 201 and has an inside surface 211a which partially defines the second space 30. The first output shaft member 215 exists in the second space 30 and is axially aligned with the first input shaft member 13. The first output shaft member 215 has an internal circular portion 215a radially opposite to and spaced apart from the non-circular peripheral portion 13a of the first input shaft member 13. The first output shaft member 215 is invariable in relative position and rotatable with respect to the partition member 201. The second output shaft member 216 exists in the second space 30 and is axially aligned with the second input shaft member 14. The second output shaft member 216 has an internal circular portion 216a radially opposite to and spaced apart from the non-circular peripheral portion 14a of the second input shaft member 14. The second output shaft member 216 is invariable in relative position and rotatable with respect to the partition member 201. The flexible cylindrical member 212 radially surrounds both of the non-circular portions 13a and 14a of the first and second input shaft members 13 and 14 and is radially encircled by both of the internal circular portions 215a and 216a of the first and second output shaft members 215 and 216. The first and second input shaft members 13 and 14 and the first and second output shaft members 215 and 216 are rotatable about their own axes with respect to the flexible cylindrical member 212. The flexible cylindrical member 212 has a first transformable intervening portion 221 between the non-circular peripheral portion 13a of the first input shaft member 13 and the internal circular portion 215a of the first output shaft member 215. The flexible cylindrical member 212 further has a second transformable intervening portion 222 between the non-circular peripheral portion 14a of the second input shaft member 14 and the internal circular portion 216a of the second output shaft member 216. The non-circular peripheral portions 13a and 14a of the first and second input shaft members 13 and 14 are engaged with the internal circular portions 215a and 216a of the first and second output shaft members 215 and 216 through the first and second transformable intervening members 221 and 222, respectively. The first transformable intervening portion 221 of the flexible cylindrical member 212 is transformed in accordance with the first rotary motion of the non-circular peripheral portion 13a of the first input shaft member 13 to rotate the internal circular portion 215a of the first output shaft member 215. The second transformable intervening portion 222 of the flexible cylindrical member 212 is transformed in accordance with the second rotary motion of the non-circular peripheral portion 14a of the second input shaft member 14 to rotate the internal circular portion 216a of the second output shaft member 216.

The partition member 201 has a through bore 201a. The flexible cylindrical member 212 is fixedly supported at one end 212a thereof by partition member 201 in coaxial position with respect to the through bore 201a of the partition member 201 and closed at the other end 212b thereof to form a cup-shaped configuration. The flexible cylindrical member 212 is received in the cylindrical support member 211. As a result, the first and second spaces 31 and 30 are disconnected in spatial communication from each other by both of the partition member 201 and the flexible cylindrical member 212.

The first and second transformable intervening portions 221 and 222 of the flexible cylindrical member 212 are formed with first and second externally toothed gear portions, respectively. The internal circular portions 215a and 216a of the first and second output shaft members 215 and 216 are formed with internally toothed gear portions, respectively. The first externally toothed gear portion of the flexible cylindrical member 212 is held in mesh with the internally toothed gear portion of the first output shaft member 215. The internally toothed gear portion of the first output shaft member 215 has tooth number larger than that of the first externally toothed gear portion of the flexible cylindrical member 212. The second externally toothed gear portion of the flexible cylindrical member 212 is held in mesh with the internally toothed gear portion of the second output shaft member 216. The internally toothed gear portion of the second output shaft member 216 has tooth number larger than that of the second externally toothed gear portion of the flexible cylindrical member 212. The first output shaft member 215 is rotated at low speed in accordance with the difference in tooth number between the internally toothed gear portion of the first output shaft member 215 and the first externally toothed gear portion of the flexible cylindrical member 212. Likewise, the second shaft member 216 is rotated at low speed in accordance with the difference in tooth number between the internally toothed gear portion of the second output shaft member 216 and the second externally toothed gear portion of the flexible cylindrical member 212. This results in the fact that the first and second output shaft members 215 and 216 can be rotated extremely slowly in comparison to the first and second input shaft members 13 and 14.

The flexible cylindrical member 212 is formed by fixedly connecting two different parts which consist of a first flexible cylindrical part 224 and a second flexible cylindrical part 225. The first flexible cylindrical part 224 includes the first transformable intervening portion 221, while the second flexible cylindrical part 225 includes the second transformable intervening portion 222. The first and second flexible cylindrical parts 224 and 225 include flanges 224a and 225a, respectively. The flange 224a of the first flexible cylindrical part 224 and the flange 225a of the second flexible cylindrical part 225 are opposite to and fixedly connected with each other to form a rigid portion 223 between the first and second transformable intervening portions 221 and 222 of the flexible cylindrical member 212. The rigid portion 223 has a thickness larger than thicknesses of the first and second transformable intervening portions 221 and 222 of the flexible cylindrical member 212, thereby making the rigid portion 223 more rigid than the first and second transformable intervening portions 221 and 222 of the flexible cylindrical member 212. Furthermore, the rigid portion 223 of the flexible cylindrical member 212 is radially protruded, so that the rigid portion 223 has a higher modulus of rigidity and accordingly becomes rigid all the more. This results in the fact that the transmission gear allows the first and second transformable intervening portions 221 and 222 to transform independently of each other without interference, thereby transmitting the first and second rotary motions from the first and second input shaft members 13 and 14 to the first and second output shaft members 215 and 216, respectively, in independent relationship to each other. The flanges 224a and 225a of the first and second flexible cylindrical parts 224 and 225 can be securely coupled with each other through a sealing member (not shown) to form the flexible cylindrical member 212 by bolting the first and second flexible cylindrical parts 224 and 225 of the flexible cylindrical member 212 to each other. As described above, the rigid portion 223 of the flexible cylindrical member 212 has a high modulus of rigidity, thereby making it possible to couple the first flexible cylindrical part 224 of the flexible cylindrical member 212 to the second flexible cylindrical part 225 of the flexible cylindrical member 212 with ease.

Figure 8:
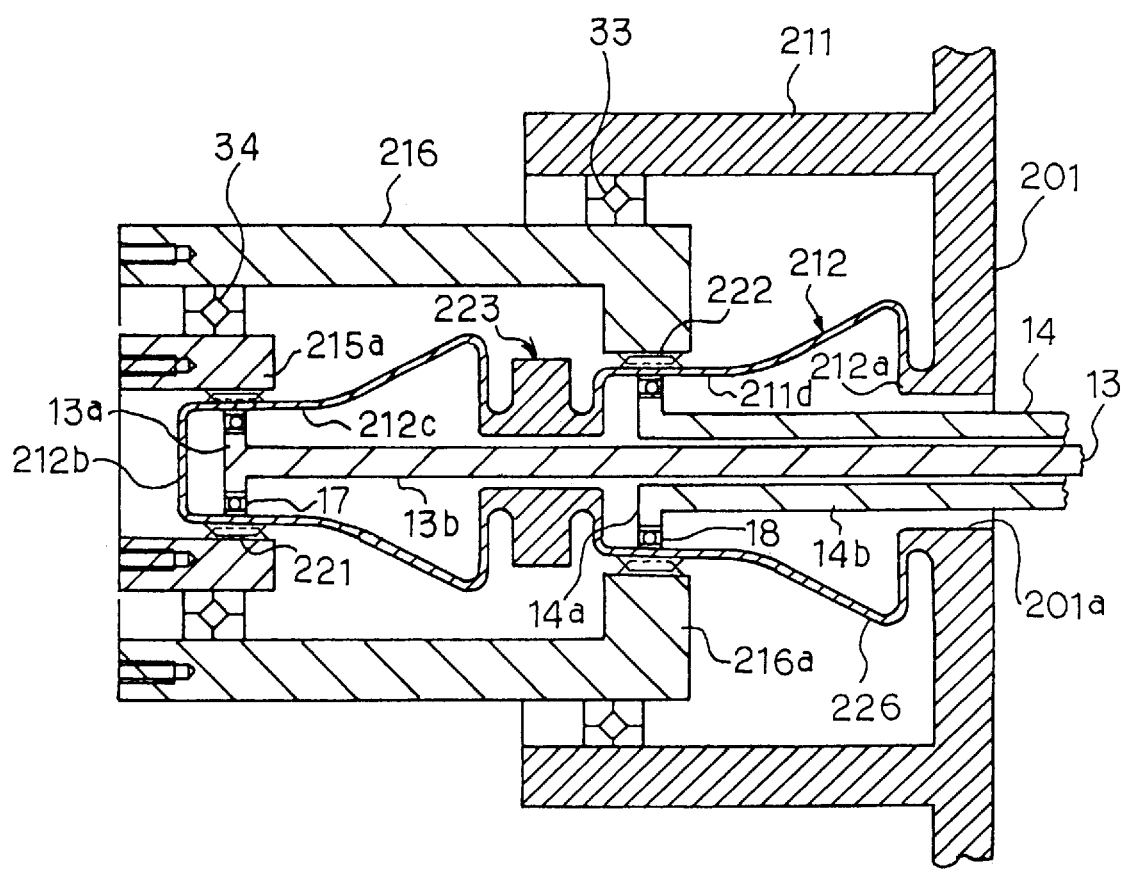
FIG. 8 is a cross sectional view showing another embodiment of the transmission gear shown in FIG. 7.

Although the flexible cylindrical member 212 shown in FIG. 7 is formed by hermetically coupling the first and second flexible cylindrical parts 224 and 225, the flexible cylindrical member 212 may be constituted by the first and second flexible parts integrally formed with each other as shown in FIG. 8. In addition, the flexible cylindrical member 212 may be integrally formed with the partition member 201 and the cylindrical support member 221. If the flexible cylindrical member 212 is formed as shown in FIG. 8, the driving mechanism side and the working mechanism side of the transmission gear can be surely disconnected in spatial communication from each other.

Figure 9:
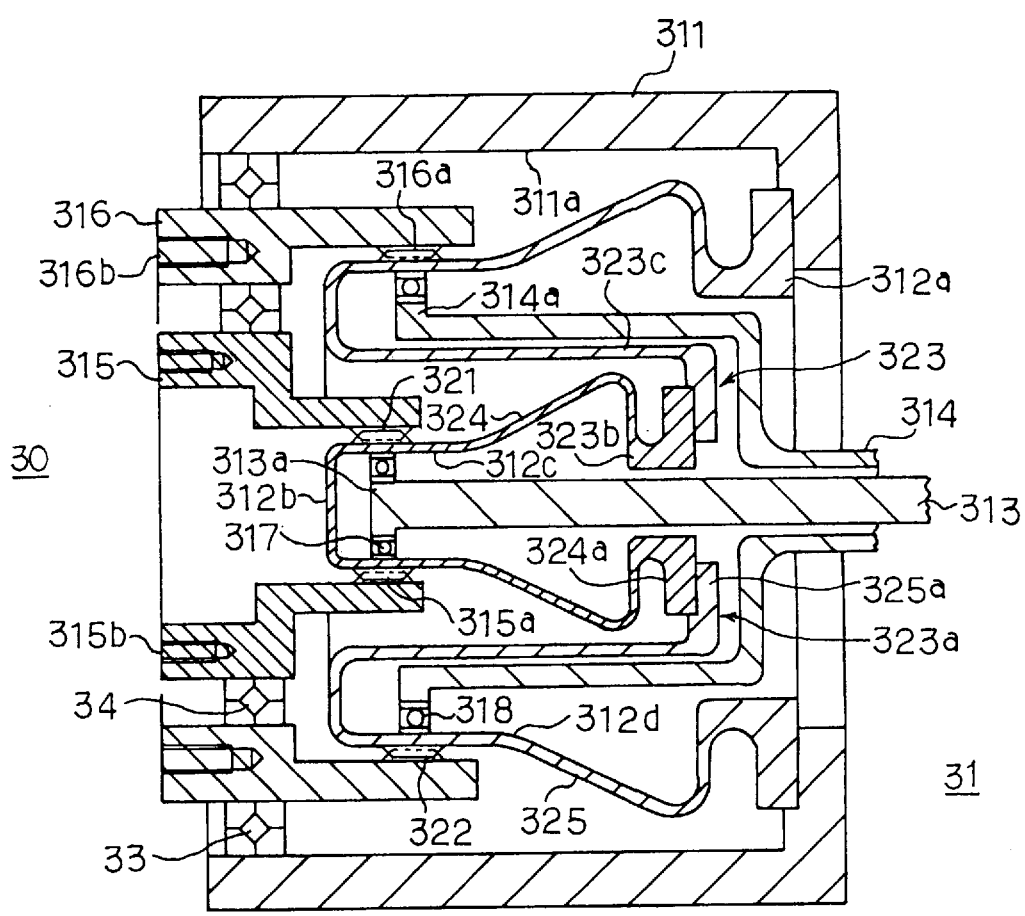
FIG. 9 is a cross sectional view showing a fifth preferred embodiment of the transmission gear according to the present invention.

Referring to FIG. 9 of the drawings, a fifth embodiment of the transmission gear according to the present invention will be described hereinlater.

As shown in FIG. 9, the present embodiment of the transmission gear comprises the same constitutional elements as those of the first embodiment of the transmission gear shown in FIGS. 1 to 3 except a cylindrical support member 311 substituted for the cylindrical support member 11 of the first embodiment, a flexible cylindrical member 312 substituted for the flexible cylindrical member 12 of the first embodiment, first and second input shaft members 313 and 314 substituted for the first and second input shaft members 13 and 14 of the first embodiment, and first and second output shaft members 315 and 316 substituted for the first and second output shaft members 15 and 16 of the first embodiment. The same constitutional elements are designated by the same reference numerals and symbols as those of the first embodiment, respectively, with intention of omitting repeated description thereof.

The cylindrical support member 311 is supported by a partition member (not shown) dividing a space in which the transmission gear exists, into two different spaces consisting of the first space 31 in which the driving mechanism exists and the second space 30 in which the working mechanism exists. The cylindrical support member 311 has an inside surface 311a partially defining the second space 30. The first input shaft member 313 has a non-circular peripheral portion 313a. The first rotary motion is applied to the first input shaft member 313. The first input shaft member 313 exists in the first space 31 and is invariable in relative position and rotatable with respect to the cylindrical support member 311. The second input shaft member 314 has a non-circular peripheral portion 314a. The second rotary motion is applied to the second input shaft member 314. The second input shaft member 314 exists in the first space 31 and is invariable in relative position and rotatable with respect to the cylindrical support member 311.

The first output shaft member 315 exists in the second space 30 and is axially aligned with the first input shaft member 313. The first output shaft member 315 has an internal circular portion 315a radially opposite to and spaced apart from the non-circular peripheral portion 313a of the first input shaft member 313. The first output shaft member 315 is invariable in relative position and rotatable with respect to the cylindrical support member 311. The second output shaft member 316 exists in the second space 30 and is axially aligned with the second input shaft member 314. The second output shaft member 316 has an internal circular portion 316a radially opposite to and spaced apart from the non-circular peripheral portion 314a of the second input shaft member 314. The second output shaft member 316 is invariable in relative position and rotatable with respect to the cylindrical support member 311.

The flexible cylindrical member 312 has first and second flexible cylindrical parts 324 and 325. The first flexible cylindrical part 324 has an inside surface 312c, while the second flexible cylindrical part 325 has an inside surface 312d. The first flexible cylindrical part 324 of the flexible cylindrical member 312 radially surrounds the non-circular portion 313a of the first input shaft member 313 and is radially encircled by the internal circular portion 315a of the first output shaft member 315. The second flexible cylindrical part 325 of the flexible cylindrical member 312 further radially surrounds of the non-circular portion 314a of the second input shaft member 314 and is radially encircled by the internal circular portion 316a of the second output shaft member 316. The first and second input shaft members 313 and 314 and the first and second output shaft members 315 and 316 are rotatable about their own axes with respect to the flexible cylindrical member 312. The flexible cylindrical member 312 has a first transformable intervening portion 321 between the non-circular peripheral portion 313a of the first input shaft member 313 and the internal circular portion 315a of the first output shaft member 315. The first transformable intervening portion 321 of the flexible cylindrical member 312 is included in the first flexible cylindrical part 324 of the flexible cylindrical member 312. The flexible cylindrical member 312 further has a second transformable intervening portion 322 between the non-circular peripheral portion 314a of the second input shaft member 314 and the internal circular portion 316a of the second output shaft member 316. The second transformable intervening portion 322 of the flexible cylindrical member 312 is included in the second flexible cylindrical part 325 of the flexible cylindrical member 312. The flexible cylindrical member 312 is supported at one end 312a thereof by cylindrical support member 311 and closed at the other end 312b thereof. The flexible cylindrical member 312 is received in the cylindrical support member 311. Therefore, the first and second spaces 30 and 31 are disconnected in spatial communication from each other by both of the cylindrical support member 311 and the flexible cylindrical member 312.

The non-circular peripheral portions 313a and 314a of the first and second input shaft members 313 and 314 are engaged with the internal circular portions 315a and 316a of the first and second output shaft members 315 and 316 through the first and second transformable intervening members 321 and 322, respectively. The first transformable intervening portion 321 of the flexible cylindrical member 312 is transformed in accordance with the one of the rotary motions of the non-circular peripheral portion 313a of the first input shaft member 313 to rotate the internal circular portion 315a of the first output shaft member 315. The second transformable intervening portion 322 of the flexible cylindrical member 312 is transformed in accordance with the other of the rotary motions of the non-circular peripheral portion 314a of the second input shaft member 314 to rotate the internal circular portion 316a of the second output shaft member 316.

The transmission gear further comprises first and second inside bearing members 317 and 318. The first inside bearing member 317 intervenes between the non-circular peripheral portion 313a of the first input shaft member 313 and the flexible cylindrical member 312 for allowing the first input shaft member 313 to rotate smoothly with respect to the flexible cylindrical member 312. Similarly, the second inside bearing member 318 intervenes between the non-circular peripheral portion 314a of the second input shaft member 314 and the flexible cylindrical member 312 for allowing the second input shaft member 314 to rotate smoothly with respect to the flexible cylindrical member 312. The first and second inside bearing members 317 and 318 are flexible enough to transform in imitation of the flexible cylindrical member 312 at the time when the non-circular peripheral portions 313a and 314a of the first and second input shaft members 313 and 314 are rotated, respectively.

The first and second transformable intervening portions 321 and 322 of the flexible cylindrical member 312 are formed with first and second externally toothed gear portions, respectively. The internal circular portions 315a and 316a of the first and second output shaft members 315 and 316 are formed with internally toothed gear portions, respectively. The first externally toothed gear portion of the flexible cylindrical member 312 is held in mesh with the internally toothed gear portion of the first output shaft member 315. The internally toothed gear portion of the first output shaft member 315 has tooth number larger than that of the first externally toothed gear portion of the flexible cylindrical member 312. The second externally toothed gear portion of the flexible cylindrical member 312 is held in mesh with the internally toothed gear portion of the second output shaft member 316. The internally toothed gear portion of the second output shaft member 316 has tooth number larger than that of the second externally toothed gear portion of the flexible cylindrical member 312. The first output shaft member 315 is rotated at low speed in accordance with the difference in tooth number between the internally toothed gear portion of the first output shaft member 315 and the first externally toothed gear portion of the flexible cylindrical member 312. Furthermore, the second shaft member 316 is rotated at low speed in accordance with the difference in tooth number between the internally toothed gear portion of the second output shaft member 316 and the second externally toothed gear portion of the flexible cylindrical member 312. This results in the fact that the first and second output shaft members 315 and 316 can be rotated extremely slowly in comparison to the first and second input shaft members 313 and 314.

The second input shaft member 314 has a tubelike configuration and has the first input shaft member 313 threaded therethrough. The second output shaft member 316 has a cylindrical configuration. The second output shaft member 316 is received in and rotatably supported by the cylindrical fixed member 311. The first output shaft member 315 is received in and rotatably supported by the second output shaft member 316. The first and second flexible cylindrical parts 324 and 325 include flanges 324a and 325a, respectively. The flange 324a of the first flexible cylindrical part 324 and the flange 325a of the second flexible cylindrical part 325 are fixedly connected with each other to form a rigid portion 323 between the first transformable intervening portion 321 and the second transformable intervening portion 322 of the flexible cylindrical member 312. The rigid portion 323 includes a circular portion 323a radially extending around the axis with respect to the flexible cylindrical member 312, cylindrical portions 323b and 323c. The internally cylindrical portion 323b of the rigid portion 323 axially extends along the axis with respect to the flexible cylindrical member 312. The externally cylindrical portion 323c if the rigid portion 323 axially extends along the axis with respect to the flexible cylindrical member 312. The internally cylindrical portion 323b and the externally cylindrical portion 323c are arranged in coaxial position with respect to the flexible cylindrical member 312. The rigid portion 323 of the flexible cylindrical member 312 has a thickness larger than that of the first and second transformable intervening portions 321 and 322 of the flexible cylindrical member 312, thereby making the rigid portion 323 more rigid than the first and second transformable intervening portions 321 and 322 of the flexible cylindrical member 312. Furthermore, the rigid portion 323 of the flexible cylindrical member 312 has a higher modulus of rigidity and accordingly becomes rigid all the more. This results in the fact that the transmission gear allows the first and second transformable intervening portions 321 and 322 to transform independently of each other without interference, thereby transmitting the first and second rotary motions from the first and second input shaft members 313 and 314 to the first and second output shaft members 315 and 316, respectively, in independent relationship to each other.

As described above, the flexible cylindrical member 312 has at least two turnup portions 324 and 325 for causing the first and second transformable intervening portions 321 and 322 to correspond in axial position to each other. All of the non-circular peripheral portions 313a and 314a of the first and second input shaft members 313 and 314 and the internal circular portions 315a and 316a of the first and second output shaft members 315 and 316 correspond in axial position to each other. The flanges 324a and 325a of the first and second flexible cylindrical parts 324 and 325 can be securely coupled with each other through a sealing member (not shown) to form the flexible cylindrical member 312 by bolting the first and second flexible cylindrical parts 324 and 325 of the flexible cylindrical member 312 to each other. As described above, the rigid portion 323 of the flexible cylindrical member 312 has a high modulus of rigidity, thereby making it possible to couple the first flexible cylindrical part 324 of the flexible cylindrical member 312 to the second flexible cylindrical part 325 of the flexible cylindrical member 312 with ease.

Figure 10:
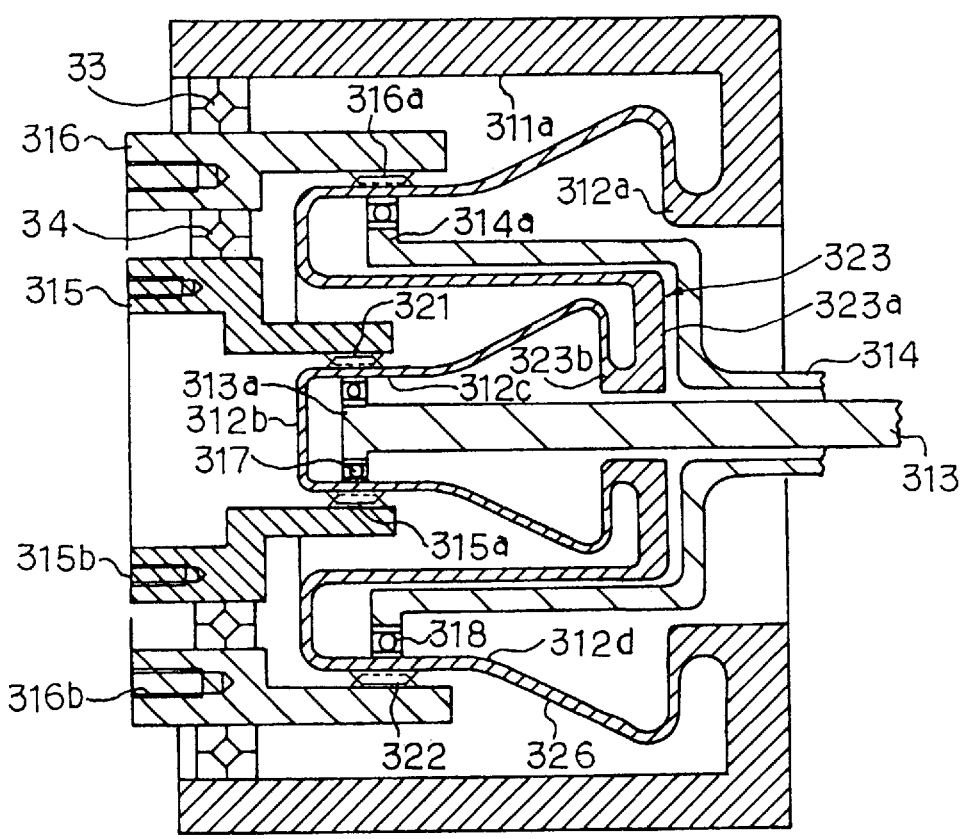
FIG. 10 is a cross sectional view showing another embodiment of the transmission gear shown in FIG. 9.

As will be appreciated from the construction of the fifth embodiment of the transmission gear, the transmission gear becomes compact in axial length. Although the flexible cylindrical member 312 shown in FIG. 9 is formed by hermetically coupling the first and second flexible cylindrical parts 324 and 325, the flexible cylindrical member 312 may be constituted by the first and second flexible parts integrally formed with each other as shown in FIG. 10. In addition, the flexible cylindrical member 312 may be integrally formed with the cylindrical support member 311. If the flexible cylindrical member 312 is formed as shown in FIG. 10, the driving mechanism side and the working mechanism side of the transmission gear can be surely disconnected in spatial communication from each other.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling with the scope of the invention.

What is claimed is:

1. A transmission gear for transmitting two rotary motions from a driving mechanism to a working mechanism, comprising:

a first input shaft member to which one of said rotary motions is applied and which has a non-circular peripheral portion;

a second input shaft member to which the other of said rotary motions is applied and which has a non-circular peripheral portion;

a first output shaft member axially aligned with said first input shaft member and having an internal circular portion radially opposite to and spaced apart from the non-circular peripheral portion of said first input shaft member;

a second output shaft member axially aligned with said second input shaft member and having an internal circular portion radially opposite to and spaced apart from the non-circular peripheral portion of said second input shaft member; and a flexible cylindrical member radially surrounding both of the non-circular portions of said first and second input shaft members and radially encircled by both of the internal circular portions of said first and second output shaft members, said first and second input shaft members and said first and second output shaft members being rotatable about their own axes with respect to said flexible cylindrical member, said flexible cylindrical member having a first transformable intervening portion between the non-circular peripheral portion of said first input shaft member and the internal circular portion of said first output shaft member, said flexible cylindrical member further having a second transformable intervening portion between the non-circular peripheral portion of said second input shaft member and the internal circular portion of said second output shaft member, the non-circular peripheral portions of said first and second input shaft members being engaged with the internal circular portions of said first and second output shaft members through said first and second transformable intervening members, respectively, said first transformable intervening portion of said flexible cylindrical member being transformed in accordance with said one of said rotary motions of the non-circular peripheral portion of said first input shaft member to rotate the internal circular portion of said first output shaft member, said second transformable intervening portion of said flexible cylindrical member being transformed in accordance with said other of said rotary motions of the non-circular peripheral portion of said second input shaft member to rotate the internal circular portion of said second output shaft member, said flexible cylindrical member further having a buffer portion between said first and second transformable intervening portions for allowing said first and second transformable intervening portions to transform independently of each other without interference, thereby transmitting said rotary motions from said first and second input shaft members to said first and second output shaft members, respectively, in independent relationship to each other.

2. A transmission gear as set forth in claim 1, in which said buffer portion of said flexible cylindrical member is rigid enough to sever a relation between the transformations of said first and second transformable intervening portions of said flexible cylindrical member.

3. A transmission gear as set forth in claim 1, in which said buffer portion of said flexible cylindrical member has a thickness which is large enough to sever a relation between the transformation of said first and second intervening potions of said flexible cylindrical member.

4. A transmission gear as set forth in claim 1, in which said buffer portion of said flexible cylindrical member is long enough to sever a relation between the transformations of said first and second transformable intervening portions of said flexible cylindrical member.

5. A transmission gear as set forth in claim 1, in which said first and second transformable intervening portions of said flexible cylindrical member are formed with first and second externally toothed gear portions, respectively, the internal circular portions of said first and second output shaft members being formed with internally toothed gear portions, respectively, said first externally toothed gear portion of said flexible cylindrical member being held in mesh with the internally toothed gear portion of said first output shaft member, the internally toothed gear portion of said first output shaft member having tooth number larger than that of said first externally toothed gear portion of said flexible cylindrical member, said second externally toothed gear portion of said flexible cylindrical member being held in mesh with the internally toothed gear portion of said second output shaft member, and the internally toothed gear portion of said second output shaft member having tooth number larger than that of said second externally toothed gear portion of said flexible cylindrical member.

6. A transmission gear as set forth in claim 1, further comprising:

a first inside bearing member intervening between the non-circular peripheral portion of said first input shaft member and said flexible cylindrical member for allowing said first input shaft member to rotate smoothly with respect to said flexible cylindrical member;

a first outside bearing member intervening between said flexible cylindrical member and the internal circular portion of said first output shaft member for allowing said first output shaft member to rotate smoothly with respect to said flexible cylindrical member;

a second inside bearing member intervening between the non-circular peripheral portion of said second input shaft member and said flexible cylindrical member for allowing said second input shaft member to rotate smoothly with respect to said flexible cylindrical member; and a second outside bearing member intervening between said flexible cylindrical member and the internal circular portion of said second output shaft member for allowing said second output shaft member to rotate smoothly with respect to said flexible cylindrical member.

7. A transmission gear as set forth in claim 1, in which said flexible cylindrical member has at least two turnup portions for causing said first and second transformable intervening portions to correspond in axial position to each other, all of said non-circular peripheral portions of said first and second input shaft members and said internal circular portions of said first and second output shaft members in axial position corresponding in axial position to each other.

8. A transmission gear as set forth in claim 1, in which said flexible cylindrical member is formed by fixedly connecting two different parts which consist of a first flexible cylindrical part including said first transformable intervening portion and a second flexible cylindrical part including said second transformable intervening portion.

9. A transmission gear for transmitting two rotary motions from a driving mechanism to a working mechanism, comprising:

a partition member dividing a space in which said transmission gear exists, into two different spaces consisting of a first space in which said driving mechanism exists and a second space in which said working mechanism exists;

a first input shaft member to which one of said rotary motions is applied and which has a non-circular peripheral portion, said first input shaft member existing in said first space and being invariable in relative position and rotatable with respect to said partition member;

a second input shaft member to which the other of said rotary motions is applied and which has a non-circular peripheral portion, said second input shaft member existing in said first space and being invariable in relative position and rotatable with respect to said partition member;

a first output shaft member existing in said second space and axially aligned with said first input shaft member, said first output shaft member having an internal circular portion radially opposite to and spaced apart from the non-circular peripheral portion of said first input shaft member, said first output shaft member being invariable in relative position and rotatable with respect to said partition member;

a second output shaft member existing in said second space and axially aligned with said second input shaft member, said second output shaft member having an internal circular portion radially opposite to and spaced apart from the non-circular peripheral portion of said second input shaft member, said second output shaft member being invariable in relative position and rotatable with respect to said partition member; and a flexible cylindrical member radially surrounding both of the non-circular portions of said first and second input shaft members and radially encircled by both of the internal circular portions of said first and second output shaft members, said first and second input shaft members and said first and second output shaft members being rotatable about their own axes with respect to said flexible cylindrical member, said flexible cylindrical member having a first transformable intervening portion between the non-circular peripheral portion of said first input shaft member and the internal circular portion of said first output shaft member, said flexible cylindrical member further having a second transformable intervening portion between the non-circular peripheral portion of said second input shaft member and the internal circular portion of said second output shaft member, said flexible cylindrical member being supported at one end thereof by partition member and closed at the other end thereof to form a cup-shaped configuration, said first and second spaces being disconnected in spatial communication from each other by both of said partition member and said flexible cylindrical member, the non-circular peripheral portions of said first and second input shaft members being engaged with the internal circular portions of said first and second output shaft members through said first and second transformable intervening members, respectively, said first transformable intervening portion of said flexible cylindrical member being transformed in accordance with said one of said rotary motions of the non-circular peripheral portion of said first input shaft member to rotate the internal circular portion of said first output shaft member, said second transformable intervening portion of said flexible cylindrical member being transformed in accordance with said other of said rotary motions of the non-circular peripheral portion of said second input shaft member to rotate the internal circular portion of said second output shaft member, said flexible cylindrical member further having a buffer portion between said first and second transformable intervening portions for allowing said first and second transformable intervening portions to transform independently of each other without interference, thereby transmitting said rotary motions from said first and second input shaft members to said first and second output shaft members, respectively, in independent relationship to each other.

10. A transmission gear as set forth in claim 9, further comprising a cylindrical support member supported by said partition member and has at least an inside surface partially defining a third space, said flexible cylindrical member being received in said cylindrical support member, said second input shaft member having a tubelike configuration and having said first input shaft member threaded therethrough, said second output shaft member having a cylindrical configuration, said second output shaft member being received in and rotatably supported by said cylindrical fixed member, said first output shaft member being received in and rotatably supported by said second output shaft member.

11. A transmission gear as set forth in claim 10, in which said driving mechanism consists of a first motor for rotating said first input shaft member and a second motor for rotating said second input shaft member, said second motor being supported by said cylindrical support member and having a through bore extending axially, said first motor being supported by said second motor, said first input shaft member going through said through bore of said second motor and being operatively connected to said first motor, and said second input shaft member being partially received in said through bore of said second motor and operatively connected to said second motor.

12. A transmission gear as set forth in claim 10, further transmitting a rectilinear motion from said driving mechanism to said working mechanism, said driving mechanism including a rectilinear motion producing device for producing said rectilinear motion, said rectilinear motion being applied to said cylindrical support member, said transmission gear further comprising:

a cylindrical guide member fixedly supported by said partition member and having said cylindrical support member received therein, said flexible cylindrical member being fixedly connected to said cylindrical support member, and said cylindrical support member being slidably moved with respect to said cylindrical guide member by said rectilinear motion, and said rectilinear motion being transmitted from said drive mechanism to said working mechanism through said cylindrical support member and said first and second output shaft members; and seal means for hermetically sealing a gap between said cylindrical guide member and said cylindrical support member.

13. A transmission gear as set forth in claim 9, in which said buffer portion of said flexible cylindrical member is rigid enough to sever a relation between the transformations of said first and second transformable intervening portions of said flexible cylindrical member.

14. A transmission gear as set forth in claim 9, in which said buffer portion of said flexible cylindrical member has a thickness which is large enough to sever a relation between the transformation of said first and second intervening potions of said flexible cylindrical member.

15. A transmission gear as set forth in claim 9, in which said buffer portion of said flexible cylindrical member is long enough to sever a relation between the transformations of said first and second transformable intervening portions of said flexible cylindrical member.

16. A transmission gear as set forth in claim 9, in which said first and second transformable intervening portions of said flexible cylindrical member are formed with first and second externally toothed gear portions, respectively, the internal circular portions of said first and second output shaft members being formed with internally toothed gear portions, respectively, said first externally toothed gear portion of said flexible cylindrical member being held in mesh with the internally toothed gear portion of said first output shaft member, the internally toothed gear portion of said first output shaft member having tooth number larger than that of said first externally toothed gear portion of said flexible cylindrical member, said second externally toothed gear portion of said flexible cylindrical member being held in mesh with the internally toothed gear portion of said second output shaft member, and the internally toothed gear portion of said second output shaft member having tooth number larger than that of said second externally toothed gear portion of said flexible cylindrical member.

17. A transmission gear as set forth in claim 9, further comprising:

a first inside bearing member intervening between the non-circular peripheral portion of said first input shaft member and said flexible cylindrical member for allowing said first input shaft member to rotate smoothly with respect to said flexible cylindrical member;

a first outside bearing member intervening between said flexible cylindrical member and the internal circular portion of said first output shaft member for allowing said first output shaft member to rotate smoothly with respect to said flexible cylindrical member;

a second inside bearing member intervening between the non-circular peripheral portion of said second input shaft member and said flexible cylindrical member for allowing said second input shaft member to rotate smoothly with respect to said flexible cylindrical member; and a second outside bearing member intervening between said flexible cylindrical member and the internal circular portion of said second output shaft member for allowing said second output shaft member to rotate smoothly with respect to said flexible cylindrical member.

18. A transmission gear as set forth in claim 9, in which said flexible cylindrical member has at least two turnup portions for causing said first and second transformable intervening portions to correspond in axial position to each other, all of said non-circular peripheral portions of said first and second input shaft members and said internal circular portions of said first and second output shaft members in axial position corresponding in axial position to each other.

19. A transmission gear as set forth in claim 9, in which said flexible cylindrical member is formed by fixedly connecting two different parts which consist of a first flexible cylindrical part including said first transformable intervening portion and a second flexible cylindrical part including said second transformable intervening portion.

* * * * *